H. McDERMOTT.
MULTIPLE RIM RESILIENT WHEEL.
APPLICATION FILED JULY 1, 1921.

1,424,252. Patented Aug. 1, 1922.

INVENTOR
H. McDermott
BY Munn & Co.
ATTORNEYS

UNITED STATES PATENT OFFICE.

HENRY McDERMOTT, OF LEADVILLE, COLORADO.

MULTIPLE-RIM RESILIENT WHEEL.

1,424,252.  Specification of Letters Patent.  Patented Aug. 1, 1922.

Application filed July 1, 1921. Serial No. 481,861.

*To all whom it may concern:*

Be it known that I, HENRY McDERMOTT, a citizen of the United States, and a resident of Leadville, in the county of Lake and State of Colorado, have invented a new and useful Improvement in Multiple-Rim Resilient Wheels, of which the following is a full, clear, and exact description.

My invention relates to vehicle wheels, and it consists in the combinations, constructions and arrangements herein described and claimed.

An object of my invention is to provide an all-metal wheel that is sufficiently resilient for practical application to automobiles, tractors, and other vehicles.

A further object of my invention is to provide a wheel having a single hub and a plurality of rims having corresponding portions arranged to contact the ground successively, whereby "skidding" is reduced to a minimum.

A further object of my invention is to provide a device of the character described having a single hub and a plurality of rims arranged eccentrically with respect to the hub, whereby corresponding portions of the several rims contact the ground successively and a vehicle mounted on wheels embodying my invention can be propelled more readily over uneven surfaces and with less tractive power required than when the same vehicle is mounted on ground wheels of an ordinary construction.

Other objects and advantages will appear in the following specification, and the novel features of the invention will be particularly pointed out in the appended claims.

My invention is illustrated in the accompanying drawings, forming part of this application, in which—

Figure 1:
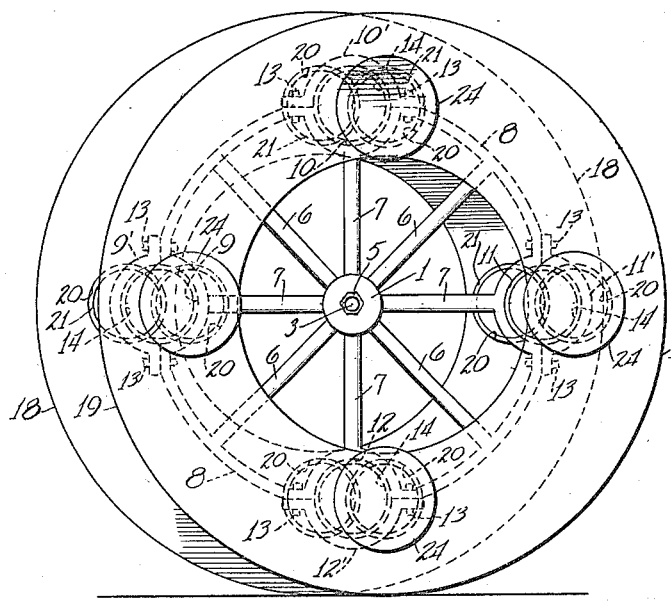
Figure 1 is a side elevation of the device.
Figure 2:
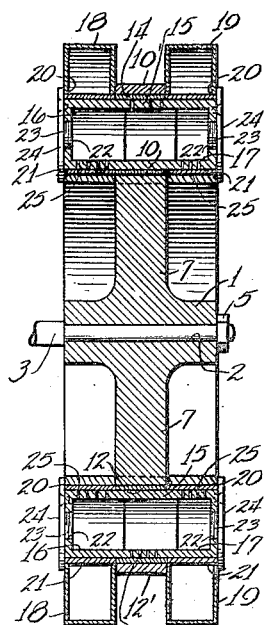
Figure 2 is a vertical transverse section through the device.
Figure 3:
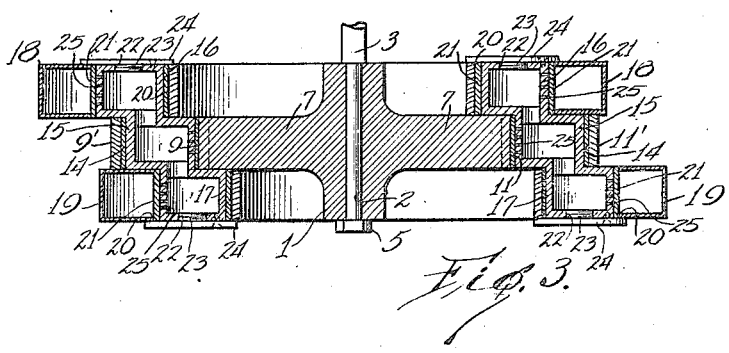
Figure 3 is a horizontal section through the same.

Referring now to the drawings, 1 denotes a wheel hub having an axial bore 2 adapted to receive an axle 3. The hub 1 is maintained on the axle 3 in any suitable manner, as by means of the cap 5. A plurality of spokes are integral with the hub and extend radially therefrom intermediate its length. Certain of said spokes, indicated at 6 are longer than the remaining spokes, which are indicated at 7. The spokes are connected at their outer ends by a rim 8 which is formed at the points of its junction with the relatively short spokes 7 to provide semi-cylindrical bearing members 9, 10, 11, and 12. It is to be observed that the bearing members are positioned 90° apart. The bearing members 9, 10, 11, and 12 have caps 9', 10', 11', and 12', respectively, that are secured thereto by bolts 13 to secure a lining or bush 14 therein. Each lining or bush 14 is cylindrical and is adapted to receive a cylindrical crank axle 15. The latter has crank disks or cylinders 16 and 17 extending from opposite ends or faces thereof. In the drawings, the crank disks or cylinders 16 and 17 and the crank axle 15, which is also cylindrical in form, are shown as being integral with one another. It will be understood that in actual practice the crank disks and axle will be made separately and rigidly secured together in the position shown or the bush 14 will be made in sections and mounted on the crank axle 15 before the latter is arranged for rotation in one of the bearing members 9, 10, 11, and 12. A crank axle 15 is provided for each of the bearing members 9, 10, 11 and 12, and each crank axle is provided with the relatively offset oppositely extending crank disks or cylinders 16 and 17.

I now provide precisely identical annular rim members 18 and 19, each of which is preferably hollow for lightness and has a diameter greater than that of the rim 8 so that the bearing caps 9', 10', 11', and 12' do not contact the ground or other surface contacted by the rim members 18 and 19 when the latter are carried upon the crank disks 16 and 17, respectively, as will now be described. Each of the rim members 18 and 19 is formed with four spaced apart openings 20 therethrough intermediate its inner and outer walls and in each of the openings 20 is disposed a bushing 21 adapted to receive one of the said crank disks. The openings 20 in each rim member are positioned 90° apart to correspond with the spacing of the crank axles.

From the foregoing description of the various parts of the device, the operation thereof may be readily understood. The rim members 18 and 19 are arranged at opposite sides of the rim 8 so that each is positioned eccentrically with respect to the hub 1 and with respect to the other. Each of the crank disks or cylinders has a threaded opening 22 in its outer end adapted to receive the shank 23 of a retaining cap 24 that has a diameter greater than that of the opening 22, whereby the rim members 18 and 19 are maintained on the crank disks 16 and 17, respectively. The double-acting crank formed of the crank axle 15 and the crank disks 16 and 17, is hollow and is adapted to hold a lubricant which is fed to the several bearings through openings 25.

When the device is in the position illustrated in Figure 1, the centers or axes of the rim members 18 and 19 and of the hub 1 are all located in the same horizontal plane, the axis of the rim member 19 being as far in advance of the axis of the hub 1 as the axis of the rim member 18 is in the rear of the axis of the hub 1. The axes of the rim members 18 and 19 are positioned 180° apart and each remains in the plane of the axis of the hub 1 during a complete revolution of the wheel. Since corresponding portions of the rim members 18 and 19 contact the ground or other surface traversed successively, it is obvious that the possibility of skidding is reduced to a minimum. Furthermore, since each contacts the ground in turn from a neutral position, the tractive resistance for a vehicle of a given weight is less when the vehicle is mounted for movement on wheels embodying my invention than when mounted on wheels of an ordinary construction. In addition, shocks and jars received by each rim member on account of inequalities of the surface traversed are absorbed without being imparted to the axle 3, this being particularly true on account of the fact that each rim member contacts the surface at intervals only and then moves into neutral position. Consequently, a vehicle supported for movement upon wheels embodying my invention can be drawn over very rough and uneven surfaces without detrimentally affecting the vehicle. The device can be made entirely of metal and is therefore not likely to wear out quickly or to get out of order easily in service.

I claim:

1. A wheel having a hub, a plurality of spokes carried by the hub, certain of said spokes being relatively short and being positioned 90° apart, a rim connecting the spokes at their outer ends and formed at the points of its junction with the relatively short spokes to provide substantially semi-cylindrical bearing members, a crank for each bearing member, each crank comprising an axle journalled in the bearing member and formed with relatively offset crank disks projecting from opposite faces thereof, a bearing cap for each bearing member, an annular rim member carried by the crank disks projecting laterally of one side of the first named rim, and a similar annular rim member carried by the crank disks projecting laterally of the opposite side of the first named rim.

2. A wheel having a hub, a plurality of spokes carried thereby, a rim connecting the spokes at their outer ends, said rim being formed to provide four bearing members, said bearing members being spaced 90° apart, a crank comprising a hollow axle and relatively offset hollow crank disks projecting from opposite faces of the axle, one of said cranks being provided for each bearing member and each being adapted to receive a lubricating substance, said crank being formed with a passage through its walls for conducting the lubricating substance from the interior thereof to the bearing, and similar annular rim members carried at opposite sides of the first named rim on the said crank disks.

3. A wheel comprising a hub, spokes, and a rim, said rim having crank bearings equally spaced therearound, a hollow rim disposed on each side of said first named rim, said hollow rims having crank bearings therein, and being equally spaced therearound, and cranks disposed in the bearings in said hollow rims and said first named rim, and being adapted to operatively connect said hollow rims to said first named rim.

HENRY McDERMOTT